(12) United States Patent
Bailey et al.

(10) Patent No.: US 7,689,821 B2
(45) Date of Patent: Mar. 30, 2010

(54) PROCESSOR WITH CONFIGURABLE ASSOCIATION BETWEEN INTERFACE SIGNAL LINES AND CLOCK DOMAINS

(75) Inventors: Roger N. Bailey, Austin, TX (US);
David A. Brown, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 974 days.

(21) Appl. No.: 11/393,172

(22) Filed: Mar. 30, 2006

(65) Prior Publication Data
US 2008/0005365 A1    Jan. 3, 2008

(51) Int. Cl.
*G06F 9/00* (2006.01)
(52) U.S. Cl. .......................... 713/100; 713/1; 713/600
(58) Field of Classification Search .................. 713/100, 713/600, 1
See application file for complete search history.

(56) References Cited

U.S. PATENT DOCUMENTS

| 5,710,910 | A | * | 1/1998 | Kehl et al. | 713/400 |
| 5,903,771 | A | * | 5/1999 | Sgro et al. | 712/20 |
| 2002/0191613 | A1 | * | 12/2002 | Jennings, III | 370/392 |

OTHER PUBLICATIONS

U.S. Appl. No. 11/361,820, filed Feb. 24, 2006, D.A. Brown et al., "Processor with Flexible Clock Configuration."

* cited by examiner

*Primary Examiner*—Tse Chen
(74) *Attorney, Agent, or Firm*—Ryan, Mason & Lewis, LLP (57) ABSTRACT

A network processor or other type of processor includes an interface comprising a plurality of signal lines, and interface circuitry adapted to receive clock signals for respective interface clock domains of the processor. The interface circuitry comprises a plurality of sampling registers clocked by respective ones of the clock signals. The interface circuitry is configurable in a variety of different configurations, each providing a different association between designated subsets of the signal lines and the clock domains of the processor.

19 Claims, 8 Drawing Sheets

FIG. 6B

PROCESSOR WITH CONFIGURABLE ASSOCIATION BETWEEN INTERFACE SIGNAL LINES AND CLOCK DOMAINS

FIELD OF THE INVENTION

The present invention relates generally to processors, such as network processors suitable for use in packet processing systems, and more particularly to interface clocking techniques in such processors.

BACKGROUND OF THE INVENTION

Network elements such as routers and switches utilize network processors to perform packet processing operations. These network processors are typically implemented in the form of integrated circuits, and include phase-locked loop (PLL) based clock generation circuitry which generates clock signals for the processor core as well as one or more additional clock domains. These additional clock domains may include, for example, domains associated with different types of internal or external memory, such as double data rate (DDR) memory, a host processor domain, and interface domains such as input port clock domains, output port clock domains, etc. It is often desirable to operate the various processor clock domains at different clock rates. For example, the DDR memory domain may operate at a higher clock rate than the processor core. Also, power consumption can often be reduced in a network processor by operating certain domains at clock rates which vary depending upon processing conditions and other factors. Accordingly, the clock generation circuitry is preferably configurable to provide different clock signals to the different domains.

U.S. patent application Ser. No. 11/361,820, filed Feb. 24, 2006 and entitled "Processor with Flexible Clock Configuration," which is commonly assigned herewith and incorporated by reference herein, discloses improved clock generation techniques for use in network processors and other types of processors, so as to provide greater flexibility in clock configuration while avoiding the need for additional configuration pins or non-volatile memory for storing configuration information.

Despite the considerable advances provided by the techniques described in the above-cited U.S. patent application, a need remains for further improvements in handling multiple clock domains in a network processor or other processor.

For example, with regard to interface domains, it is often the case that a given network processor may be utilized in a number of different processing applications. Each such application may require that the interfaces between the various ports of the network processor and its associated physical layer devices operate at different clock rates. Unfortunately, conventional network processors are unable to provide sufficient flexibility in allocating signal lines of an interface bus to multiple clock domains. One conventional approach simply uses a common clock for all of the ports, which severely restricts functionality. Other conventional approaches involve the use of multiplexed clocks to sample common interface lines. However, this can result in timing disadvantages, such as longer clock insertion delays, and also complicates scan vector testing of the processor.

It is therefore apparent that a need exists for a processor that allows each of a number of different signal lines of an interface bus to belong to one of many clock domains on a configurable basis.

SUMMARY OF THE INVENTION

The invention in an illustrative embodiment provides a network processor having interface circuitry which provides configurable association between signal lines of an interface and different interface clock domains of the processor. The signal lines may be input signal lines of the interface, output signal lines of the interface, or a combination of both.

In accordance with an aspect of the invention, a network processor or other type of processor includes an input bus or other interface comprising a plurality of signal lines, and interface circuitry adapted to receive clock signals for respective interface clock domains of the processor. The interface circuitry may be coupled between clock generation circuitry and the signal lines and adapted to receive the clock signals from the clock generation circuitry. The interface circuitry comprises a plurality of sampling registers, and in the illustrative embodiment can be configured in a variety of different configurations, each providing a different association between designated subsets of the signal lines and the clock domains of the processor.

In accordance with another aspect of the invention, the interface circuitry is configurable in at least first and second configurations. In the first configuration, a given one of the signal lines or other subset of the signal lines is sampled in a first one of the sampling registers using a first one of the clock signals associated with a first one of the interface clock domains, and an output of the first sampling register is supplied to a first one of the port logic elements also associated with said first one of the interface clock domains. Similarly, in the second configuration, the given one of the signal lines or other subset of the signal lines is sampled in a second one of the sampling registers using a second one of the clock signals associated with a second one of the interface clock domains, and an output of the second sampling register is supplied to a second one of the port logic elements also associated with said second one of the interface clock domains.

The interface in the illustrative embodiment comprises an interface between the processor and a packet framer, cell framer or other physical layer device external to the processor, and may comprise multiple interfaces with respective physical layer devices external to the processor. The signal lines of the interface may correspond to respective signal pins of the interface, for example, in an embodiment in which the processor is implemented as an integrated circuit.

In the illustrative embodiment, the signal lines of the interface may be separated into at least first and second non-overlapping subsets of signal lines, with the signal lines in a first one of the subsets each being coupled to inputs of multiple ones of the sampling registers in a corresponding first group of the sampling registers. The sampling registers in the first group of sampling registers operate using respective ones of the clock signals for the respective interface clock domains. An output of a particular one of the sampling registers in the first group of sampling registers is selectable for application to a corresponding one of the port logic elements via a multiplexer. More specifically, outputs of the sampling registers in the first group of sampling registers are applied to respective inputs of the multiplexer and an output of the multiplexer is applied to an input of one of the port logic elements. One or more configuration signals are applied to one or more selection inputs of the multiplexer so as to control selection of a particular one of the inputs for application to an input of one of the port logic elements.

In accordance with a further aspect of the invention, the interface circuitry may comprise at least one configuration register for storing information utilized to generate the one or more configuration signals. Such configuration registers may be updatable under software control using an internal core or external host processor.

Advantageously, the techniques of the invention in the illustrative embodiments allow different interface signal pins or other signal lines to be associated with multiple clock domains of a network processor on a configurable basis. A high degree of configuration flexibility is provided, such that the same network processor can accommodate a wide variety of different applications and their associated interface clocking arrangements.

DETAILED DESCRIPTION OF THE INVENTION

The invention will be illustrated herein in conjunction with an exemplary packet processing system which includes a network processor configured in a particular manner. It should be understood, however, that the invention is more generally applicable to any processor in which it is desirable to provide enhanced efficiency and flexibility in association of interface signal lines with processor clock domains.

A "processor" as the term is used herein may be implemented, by way of example and without limitation, utilizing a microprocessor, central processing unit (CPU), digital signal processor (DSP), application-specific integrated circuit (ASIC), or other type of data processing device, as well as portions and combinations of these and other devices.

A given network processor may be implemented in the form of an integrated circuit, and may itself comprise a core processing element such as a CPU or other type of data processing device, as well as memory and other circuitry.

Figure 1:
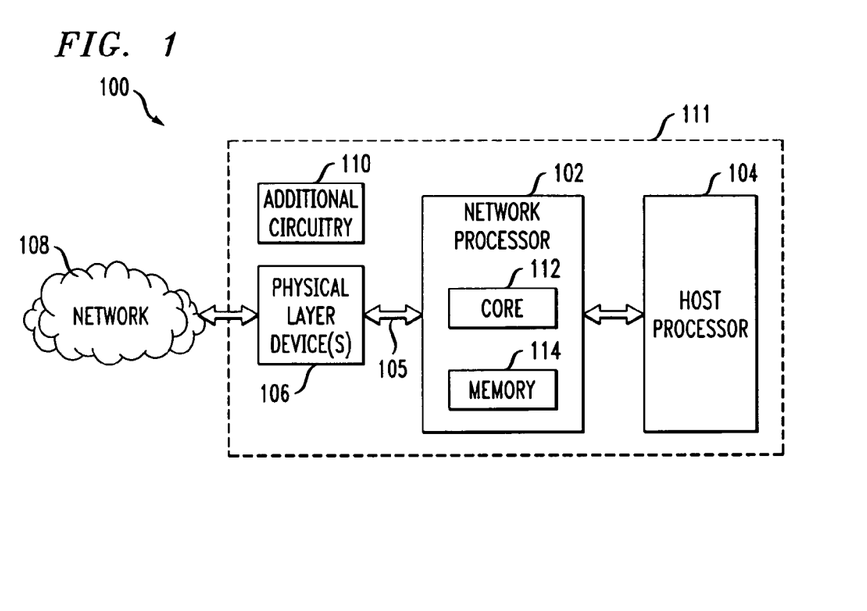
FIG. 1 is a simplified block diagram of a packet processing system in which an illustrative embodiment of the invention is implemented.

FIG. 1 shows a packet processing system 100 in an illustrative embodiment of the invention. The system 100 includes a network processor 102 that is coupled between a host processor 104 and one or more physical layer devices 106. The one or more physical layer devices 106 are coupled to a network 108. The network processor 102 in this embodiment performs processing operations for packets received from the network 108 via the physical layer device(s) 106, and delivers processed packets back to the network 108 via the physical layer device(s) 106. The network processor 102 communicates with the physical layer device(s) 106 over an interface 105. The host processor 104 provides processing support for the network processor 102 in performing certain types of packet processing operations, and may also be used to configure the network processor. Also associated with the system 100 is additional circuitry 110 which may comprise, for example, a switch fabric, memory circuitry, one or more additional processors, other processing elements, etc. in any combination. The set of elements 111 enclosed within the dashed box may be, for example, part of a line card or a port card in a router, switch or other network device.

The network processor 102 comprises a core 112 and a memory 114. The core 112 is a processing element, also referred to herein as a core processor, that is able to execute software for controlling configuration and operation of the network processor. Memory 114 may be used to store instructions and data associated with such software, and to implement registers, such as the configuration registers described elsewhere herein. In other embodiments, the core processor 112 may be eliminated and the network processor controlled via an external host such as host processor 104.

It should be understood that the particular arrangement of system elements shown in FIG. 1 is by way of illustrative example only. For example, as previously noted, the invention can be implemented in any type of processor, and is not limited to any particular packet processing application.

Figure 2:
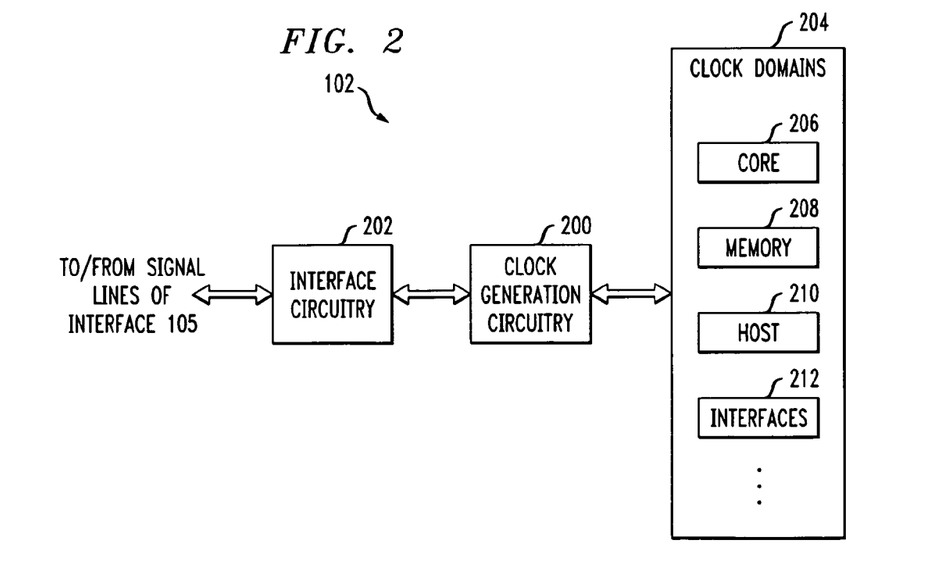
FIG. 2 is a more detailed view of a network processor of the FIG. 1 system configured in accordance with an illustrative embodiment of invention.

FIG. 2 shows the network processor 102 in greater detail. The processor 102 in this embodiment includes clock generation circuitry 200, interface circuitry 202, and a plurality of clock domains 204. Each clock domain represents a particular portion of the network processor 102, or associated supporting circuitry such as host processor 104, that receives one or more clock signals from the clock generation circuitry 200. The clock generation circuitry may comprise, for example, a clock tree or other clock distribution structure, and may deliver internally-sourced clock signals, further process externally-sourced clock signals, or perform a combination of these or other techniques. Examples of clock domains include a core processor domain 206, a memory domain 208, a host processor domain 210, interface domains 212, etc.

The term "clock domain" as used herein should be understood to include a portion of a processor which receives one or more particular clock signals from clock generation circuitry. Such clock generation circuitry may be entirely internal to the processor, or may be implemented at least in part external to the processor. For example, a clock sourced from clock generation circuitry implemented at least in part external to the processor may be processed by additional clock generation circuitry in the form of a clock tree within the processor. The clock signals of the various clock domains may be used internally, as in the case of the processor core domain, or passed on to external elements, such as an external memory or a host processor. Certain of the clock signals, such as port clocks, may originate external to the processor.

It will be assumed without limitation that the interface clock domains 212 comprise multiple clock domains each having a different clock rate associated therewith, although other types of clock domains may be used in implementing the invention.

The clock generation circuitry 200 may be configured, by way of example, in accordance with the techniques disclosed in the above-cited U.S. patent application Ser. No. 11/361,820. It should be appreciated, however, that numerous other types of clock generation circuitry may be utilized in implementing the present invention.

The interface circuitry 202 may comprise, for example, otherwise conventional input/output (IO) circuitry modified as described herein so as to permit a configurable association between various signal lines of the interface 105 and the interface clock domains 212. The operation of an illustrative embodiment of such interface circuitry will be described in greater detail below in conjunction with FIGS. 3 through 6.

The network processor 102 may include additional elements not explicitly shown in FIG. 2. For example, the network processor may comprise one or more of a segmentation engine, a classification engine, protocol data unit (PDU) buffers, a buffer controller, a queuing engine, a traffic shaper, traffic scheduler or other type of traffic manager, a link list controller, a policing engine, a statistics engine, etc. These and other typical network processor elements may be implemented in a conventional manner.

Figure 3:
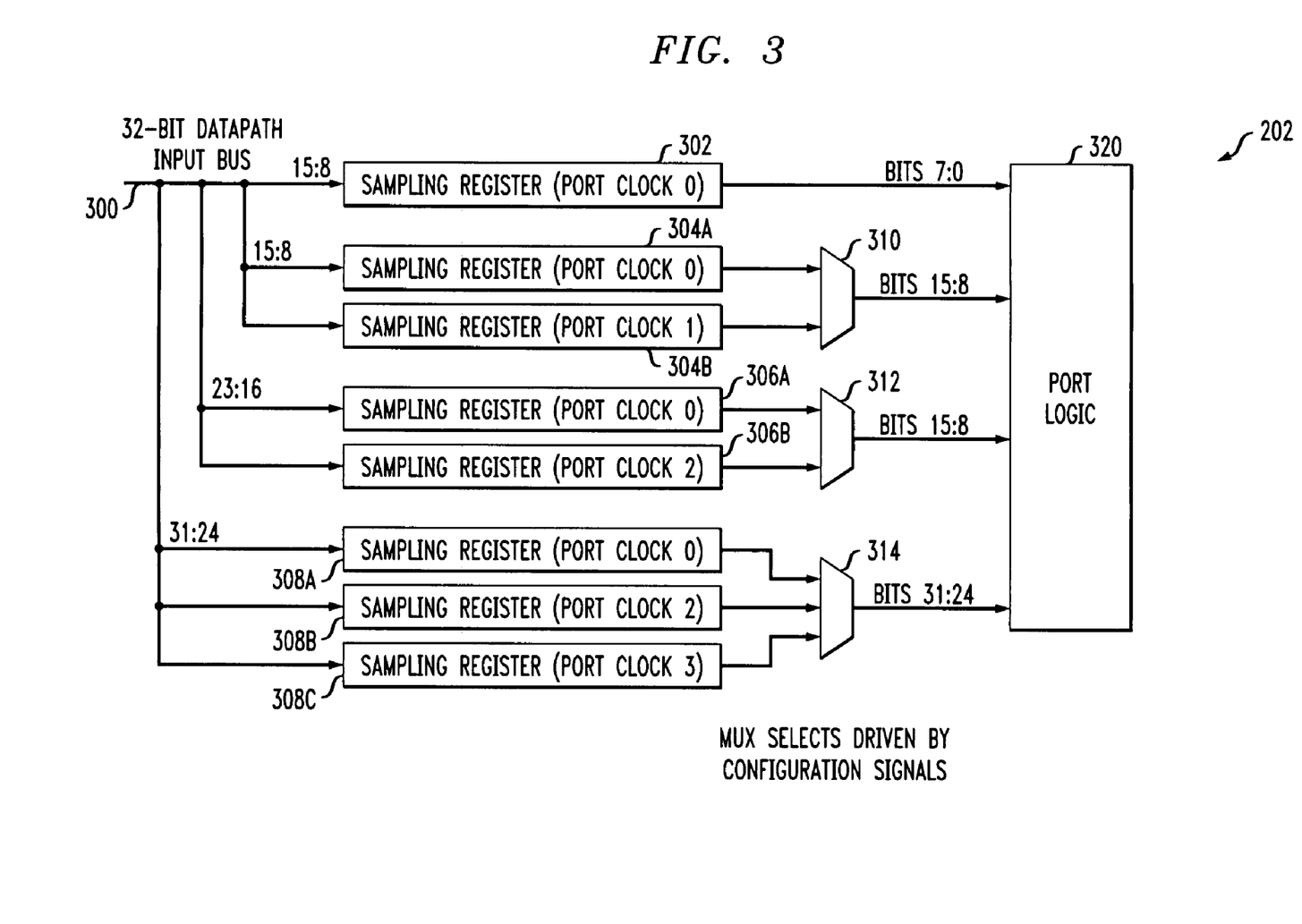
FIG. 3 shows a more detailed view of a portion of interface circuitry of the FIG. 2 network processor.

Referring now to FIG. 3, an illustrative embodiment of the interface circuitry 202 is shown in greater detail. In this embodiment, the interface circuitry 202 comprises an input bus 300, sampling registers 304, 306 and 308, multiplexers 310, 312 and 314, and port logic 320. The input bus 300 illustratively comprises a 32-bit datapath input bus carrying signals of corresponding datapath signal lines of the interface 105 between network processor 102 and the one or more physical layer devices 106. The port logic 320 comprises internal logic which processes the datapath inputs. In this embodiment, it is assumed for purposes of illustration that the port logic includes separate logic elements associated with respective ones of four different ports of the network processor, denoted herein as Port 0, Port 1, Port 2 and Port 3, although other embodiments can of course include more or fewer ports. Each of these ports is a separate port of the network processor 102, and each corresponds to a different interface clock domain as will be described.

The signal lines of the 32-bit wide datapath input bus 300 are assumed without limitation to have a one-to-one correspondence with respective signal lines of the interface 105, and both will therefore be identified using the notation [31:0]. These signal lines may, but need not, correspond to external signal pins of a packaged network processor integrated circuit. Also, it is to be appreciated that, in a given embodiment of the invention, buffers, level translators, drivers or other types of IO circuitry may be interposed between a given signal pin or other signal line of the interface 105 and the corresponding signal line of the input bus 300.

The datapath input bus 300 is separated such that signal lines [7:0] are only used by Port 0, signal lines [15:8] can be used by Port 0 or Port 1, signal lines [23:16] can be used by Port 0 or Port 2, and signal lines [31:24] can be used by Port 0, Port 2 or Port 3. For those portions of the input bus 300 that can be assigned to different ones of the multiple ports, namely, portions [15:8], [23:16] and [31:24], configuration signals applied to selection inputs, not explicitly shown in the figure, of the multiplexers 310, 312 and 314 are used to determine which of the sampling register outputs are applied to which portions of the port logic 320. This advantageously provides an efficient mechanism for associating different signal lines of the interface 105 with different interface clock domains 212 of the network processor 102.

The configuration signals applied to the selection inputs of the multiplexers 310, 312 and 314 may be supplied by or otherwise under the control of the core processor 112, the host processor 104 or another system processing element, or combinations thereof. Software running on such processors or other elements may thus be used to establish a particular one of a plurality of configurable associations between various signal lines of the interface 105 and the interface clock domains 212, via appropriate application of configuration signals to the selection inputs of the multiplexers. For example, such software may be used to store appropriate information in a set of configuration registers, not shown in the drawing, from which the configuration signals applied to the multiplexers 310, 312 and 314 are generated.

The sampling registers and port logic elements of the FIG. 3 embodiment may be of a conventional design, of a type well understood by those skilled in the art, and are therefore not further described in detail herein.

Generally, a sampling register is intended to encompass, by way of example and without limitation, synchronization elements comprising latches, flip-flops or other circuitry suitable for "clocking in" a given signal.

Three different example configurations of the physical layer device(s) 106, the interface 105, and the network processor interface circuitry 202 will now be described, with reference to FIGS. 4, 5 and 6. Generally, data signals from the datapath signal lines of the interface 105 need to be clocked using interface clocks appropriate to their respective interface clock domains.

Figure 4A:
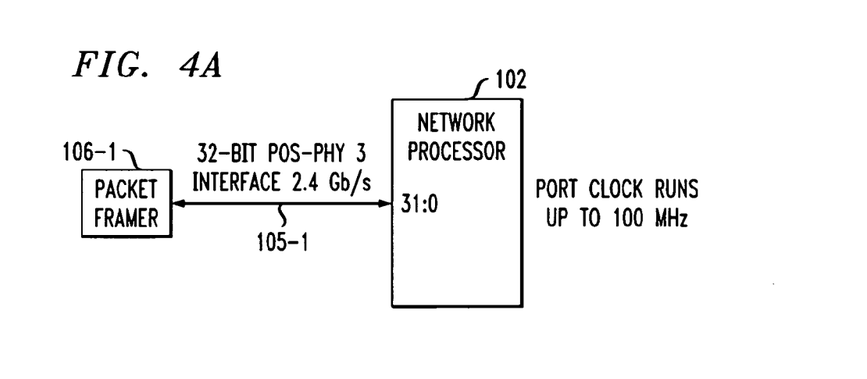
FIGS. 4A and 4B show respective system interface and interface circuitry diagrams for a first interface configuration supportable by the FIG. 2 network processor.
Figure 4B:
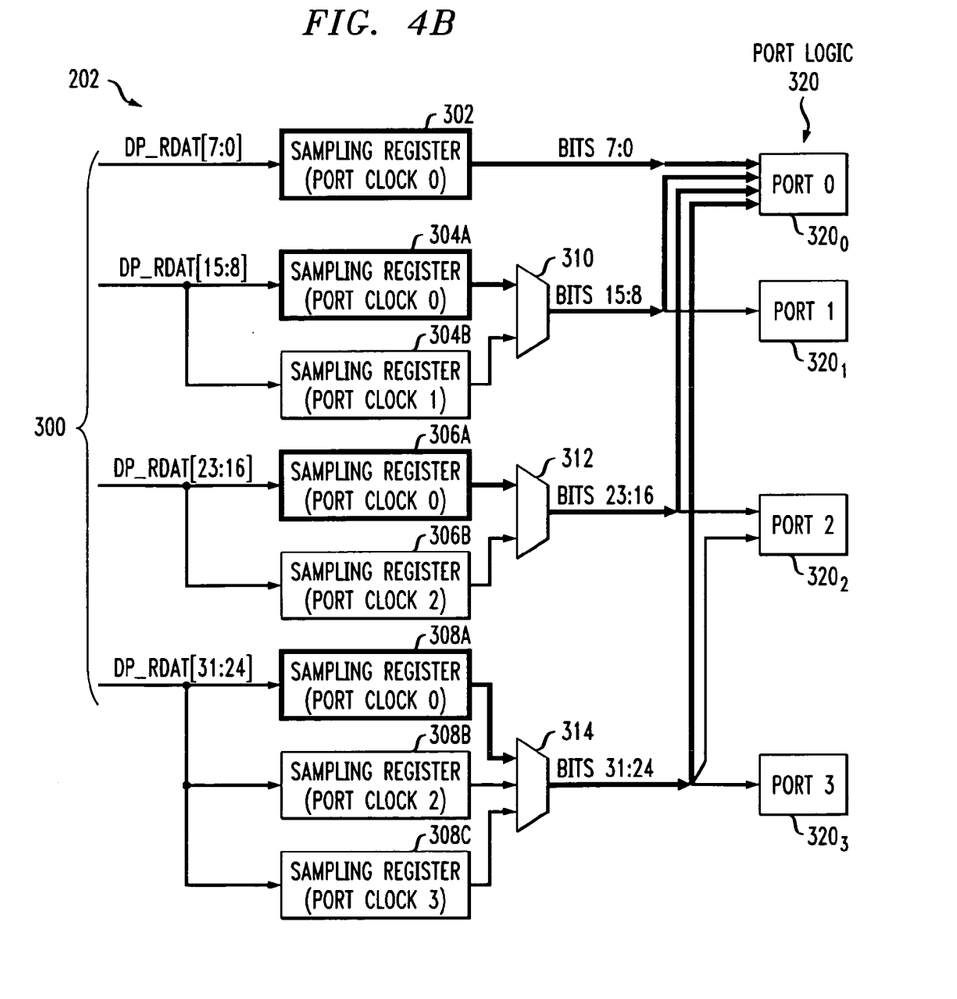

In the first configuration, to be described in conjunction with FIG. 4, all of the signal lines [31:0] are associated with the same clock domain, and thus the corresponding data signals are all clocked using the same port clock, that is, the clock of the Port 0 clock domain.

FIG. 4A shows this first configuration comprising an interface 105-1 between a single physical layer device 106-1 and network processor 102. More specifically, the physical layer device 106-1 comprises a conventional packet framer coupled to network processor 102 via a standard 32-bit POS-PHY 3 interface 105-1 operating at a data rate of 2.4 Gigabits per second (Gb/s). In this example, the port clock runs at a clock rate up to 100 MHz, which supports an OC-48 data rate, although other clock rates and data rates could of course be used in other embodiments.

For additional details regarding the POS-PHY 3 interface, see POS-PHY Saturn Compatible Packet Over SONET Interface Specification for Physical Layer Devices (Level 3), Issue 3, November 1998, which is incorporated by reference herein. The POS-PHY 3 interface is also sometimes referred to as a SPI-3 interface. See, for example, System Packet Interface Level 3: OC-48 System Interface for Physical and Link Layer Devices, IA No. OIF-SP13-01.0, June 2000, which is incorporated by reference herein. The latter document specifies a maximum clock rate of 104 MHz, as opposed to the POS-PHY 3 maximum of 100 MHz.

With reference now to FIG. 4B, the interface circuitry 202 as configured to support the interface arrangement of FIG. 4A is shown. The 32-bit input bus 300 is more specifically denoted in this example as a datapath received data interface, or DP_RDAT[31:0], and is separated into portions in the manner previously described in conjunction with FIG. 3. The port logic 320 comprises separate port logic elements associated with Port 0, Port 1, Port 2 and Port 3, respectively denoted as $320_0$, $320_1$, $320_2$ and $320_3$ in the figure.

In this first configuration, configuration signals are applied to the selection inputs of the multiplexers 310, 312 and 314 to configure the multiplexers such that the outputs of the sampling registers 304A, 306A and 308A are supplied to Port 0 logic $320_0$. The output of the sampling register 302 is also supplied to Port 0 logic $320_0$. This arrangement ensures that all of the signal lines [31:0] are associated with a single clock domain, namely, the interface clock domain of Port 0. The corresponding data signals received via the respective signal lines of the input bus are therefore sampled using the clock of the Port 0 interface clock domain.

Figure 5A:
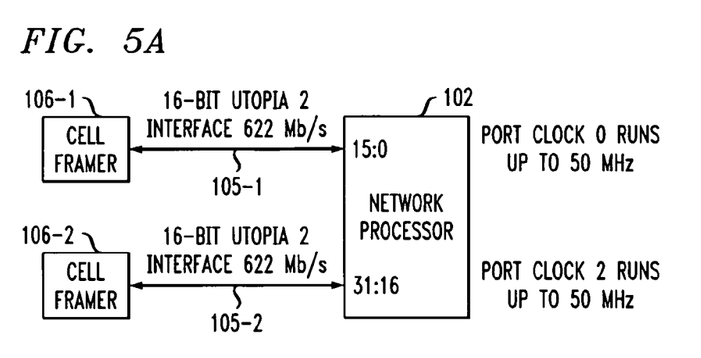
FIGS. 5A and 5B show respective system interface and interface circuitry diagrams for a second interface configuration supportable by the FIG. 2 network processor.
Figure 5B:
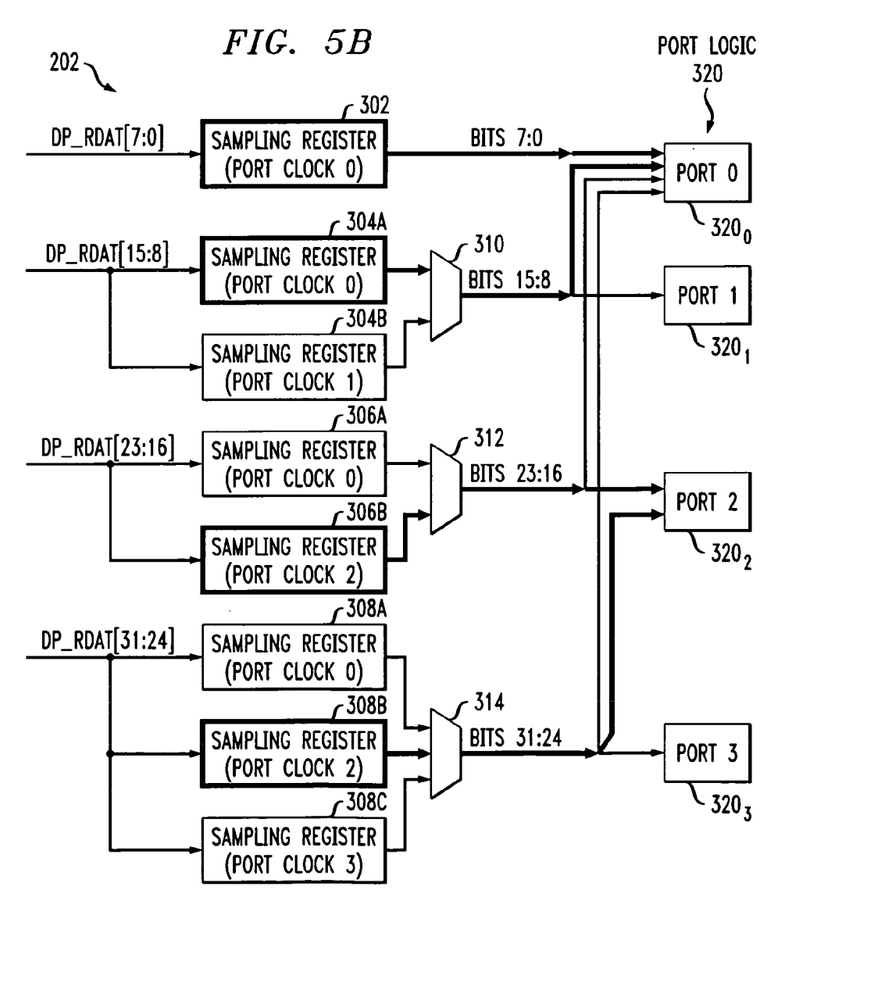

In the second configuration, to be described in conjunction with FIG. 5, signal lines [15:0] are associated with the Port 0 clock domain, and signals lines [31:16] are associated with the Port 2 clock domain. Thus, the data signals associated with the signal lines [15:0] and [31:16] are clocked using the respective Port 0 and Port 2 clocks.

FIG. 5A shows this second configuration comprising interface 105 having a first interface portion 105-1 between a first physical layer device 106-1 and network processor 102, and a second interface portion 105-2 between a second physical layer device 106-2 and network processor 102. More specifically, the physical layer devices 106-1 and 106-2 comprise respective conventional cell framers coupled to network processor 102 via respective standard 16-bit UTOPIA 2 interfaces 105-1 and 105-2 each operating at a data rate of 622 Megabits per second (Mb/s). In this example, the port clocks for Port 0 and Port 2 each run at a clock rate up to 50 MHz, which supports an OC-12 data rate, although again other clock rates and data rates could be used.

For additional details regarding the UTOPIA 2 interface, see ATM Forum, Technical Committee, UTOPIA Level 2, Version af-phy-0039.000, June 1995, which is incorporated by reference herein.

With reference now to FIG. 5B, the interface circuitry 202 as configured to support the interface arrangement of FIG. 5A is shown. The 32-bit input bus 300, denoted DP_RDAT[31:0] in the figure, is separated into portions in the manner previously described in conjunction with FIG. 3. As mentioned above, the port logic 320 comprises separate port logic elements associated with Port 0, Port 1, Port 2 and Port 3, respectively denoted as $320_0$, $320_1$, $320_2$ and $320_3$ in the figure.

In this second configuration, configuration signals are applied to the selection inputs of the multiplexers 310, 312 and 314 to configure the multiplexers such that the output of the sampling register 304A is supplied to Port 0 logic $320_0$, and the outputs of the sampling registers 306B and 308B are supplied to Port 2 logic $320_2$. As in each of the example configurations, the output of the sampling register 302 is also supplied to Port 0 logic $320_0$. This arrangement ensures that signal lines [15:0] are associated with the Port 0 clock domain, while signal lines [31:16] are associated with the Port 2 clock domain. The corresponding data signals received via the signal lines [15:0] and [31:16] are therefore sampled using the respective clocks of the Port 0 and Port 2 interface clock domains.

Figure 6A:
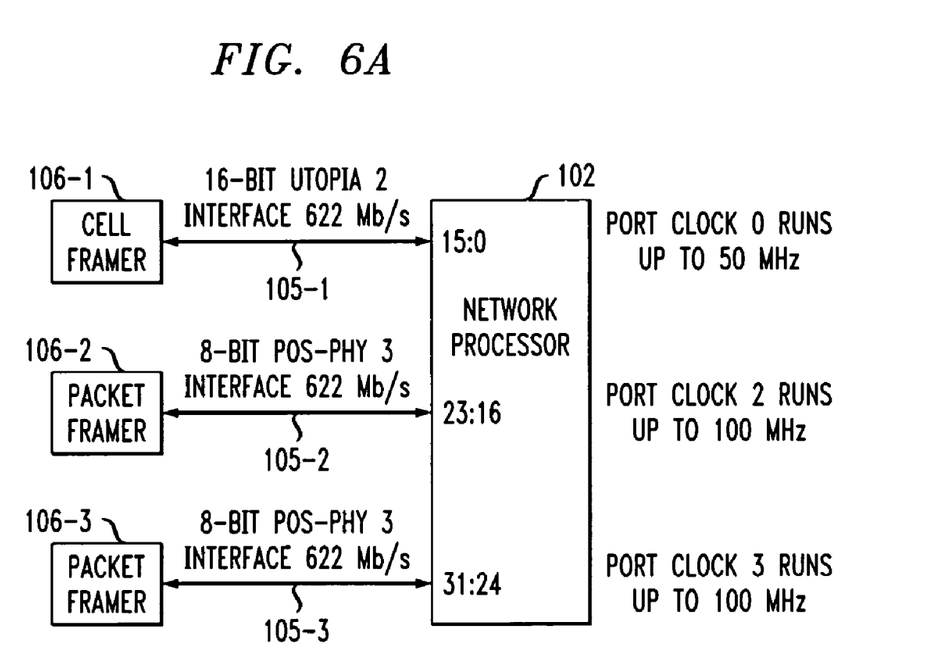
FIGS. 6A and 6B show respective system interface and interface circuitry diagrams for a third interface configuration supportable by the FIG. 2 network processor.
Figure 6B:
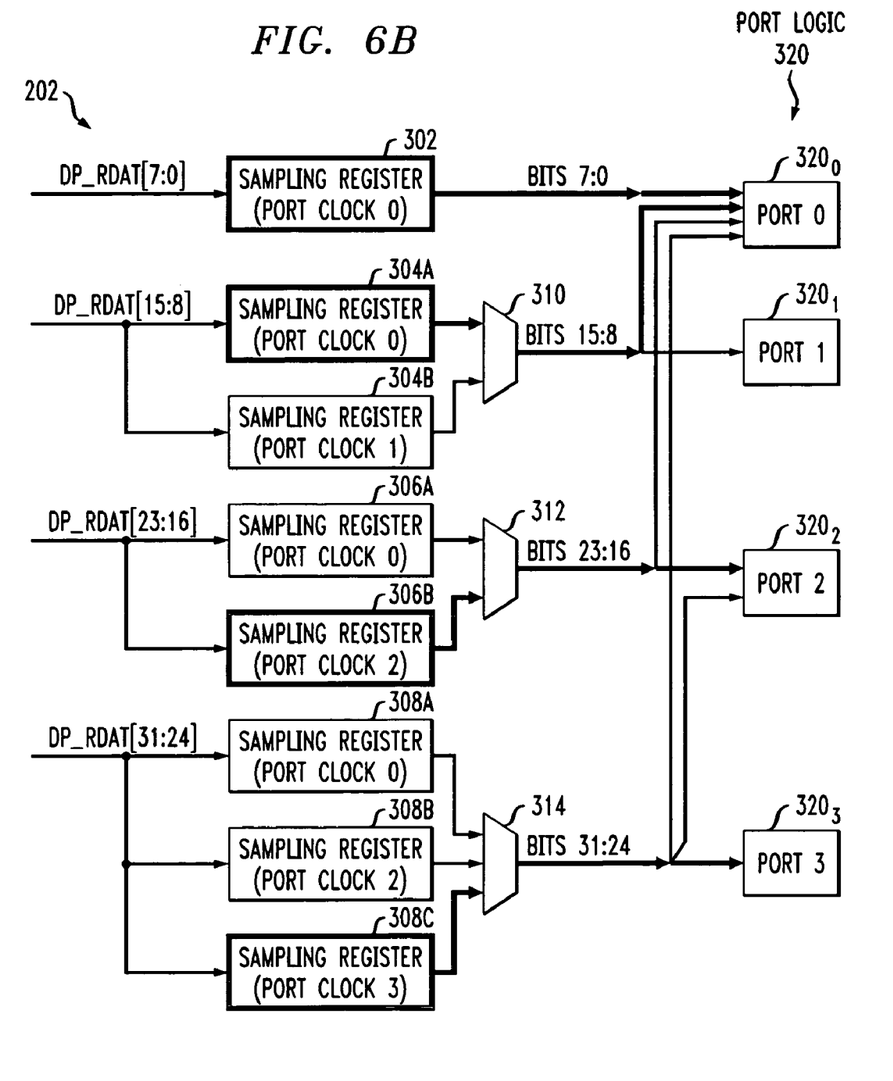

In the third configuration, to be described in conjunction with FIG. 6, signal lines [15:0] are associated with the Port 0 clock domain, signals lines [23:16] are associated with the Port 2 clock domain, and signal lines [31:24] are associated with the Port 3 clock domain. Thus, the data signals associated with the signal lines [15:0], [23:16] and [31:24] are clocked using the respective Port 0, Port 2 and Port 3 clocks.

FIG. 6A shows this third configuration comprising interface 105 having a first, second and third interface portions 105-1, 105-2 and 105-3 between respective first, second and third physical layer devices 106-1, 106-2 and 106-3 and network processor 102. More specifically, the physical layer device 106-1 comprises a conventional cell framer coupled to network processor 102 via a standard 16-bit UTOPIA 2 interface operating at a data rate of 622 Mb/s, and the physical layer devices 106-2 and 106-3 comprise respective conventional packet framers coupled to network processor 102 via respective standard 8-bit POS-PHY 3 interfaces each operating at a data rate of 622 Mb/s. In this example, the port clock for Port 0 runs at a clock rate up to 50 MHz, which supports an OC-12 data rate, and the port clocks for Port 2 and Port 3 each run at a clock rate up to 100 MHz, which supports an OC-12 data rate, although again other clock rates and data rates could be used.

With reference now to FIG. 6B, the interface circuitry 202 as configured to support the interface arrangement of FIG. 6A is shown. The 32-bit input bus 300, again denoted DP_RDAT [31:0] in the figure, is separated into portions in the manner previously described in conjunction with FIG. 3.

In this third configuration, configuration signals are applied to the selection inputs of the multiplexers 310, 312 and 314 to configure the multiplexers such that the output of the sampling register 304A is supplied to Port 0 logic $320_0$, the output of the sampling register 306B is supplied to Port 2 logic $320_2$ and the output of the sampling register 308C is supplied to Port 3 logic $320_3$. Again, as in the other example configurations, the output of the sampling register 302 is also supplied to Port 0 logic $320_0$. This arrangement ensures that signal lines [15:0] are associated with the Port 0 clock domain, signal lines [23:16] are associated with the Port 2 clock domain, and signal lines [31:24] are associated with the Port 3 clock domain. The data signals received via the signal lines [15:0], [23:16] and [31:24] are therefore clocked using the respective clocks of the Port 0, Port 2 and Port 3 interface clock domains.

It is to be appreciated that the illustrative configurations of FIGS. 4 through 6 are presented by way of example, and numerous alternative arrangements may be achieved by varying features such as the particular manner of separating the input bus into portions, the number of sampling registers per separated portion, the number and arrangement of multiplexers, and the number of port logic elements. In addition, although the physical layer devices in these examples comprise packet framers and cell framers, and the interfaces comprise UTOPIA or POS-PHY interfaces, alternative physical layer devices and interfaces may be used in other embodiments. Alternative physical layer devices include, for example, Ethernet PHY devices, which may use, for example, a Gigabit Media Independent Interface (GMII). Other alternative interfaces include, for example, the above-noted SPI-3 interfaces, which as previously indicated are substantially the same as POS-PHY 3 interfaces.

Although not shown in the illustrative first, second and third configurations of FIGS. 4 through 6, additional sampling registers may be included for sampling the DP_RDAT inputs for use by Ethernet media access controllers (MACs), for example, when the interface is configured to be a ten-bit encoded physical medium attachment (PMA). The outputs of such sampling registers may be sent to the Ethernet MACs rather than to port logic elements.

As noted above, a configuration register subject to software-based updating may be used to define the configuration signals applied to the selection inputs of the multiplexers 310, 312 and 314. An example of a four-bit configuration register of this type, suitable for providing the multiplexers with the configuration signals needed to implement the three different configurations shown in FIGS. 4 through 6, is shown below. Of course, numerous other configuration register arrangements, or other techniques for controlling association between signal lines and interface clock domains, may be used in other embodiments.

| Input sampling configuration register | | |
|---|---|---|
| Bit | Name | Description |
| 3:2 | dp_rdat_byte3_mux_sel | selects which port data coming in on DP_RDAT[31:24] is for:<br>00 = port 0<br>01 = reserved<br>10 = port 2<br>11 = port 3 |
| 1 | dp_rdat_byte2_mux_sel | selects which port data coming in on DP_RDAT[23:16] is for:<br>0 = port 0<br>1 = port 2 |
| 0 | dp_rdat_byte1_mux_sel | selects which port data coming in on DP_RDAT[15:8] is for:<br>0 = port 0<br>1 = port 1 |

As noted previously, software used to update configuration registers herein may run on an internal or external processing element. For example, such software may run on the processor core that is internal to the network processor, or on a host processor that is external to the network processor. Alternative configurations involving, for example, a combination of internal and external processing elements, may be used. The configuration register(s) may be implemented in memory 114 of network processor 102.

The particular examples of FIGS. 4, 5 and 6 all relate to signals received by the network processor 102 via interface input signal lines. However, the described techniques can be adapted in a straightforward manner to allow the controllable association of interface signal lines with particular clock domains for output signals driven from the network processor to output signal lines of the interface. Examples of such arrangements are shown in FIGS. 7 and 8.

Figure 7:
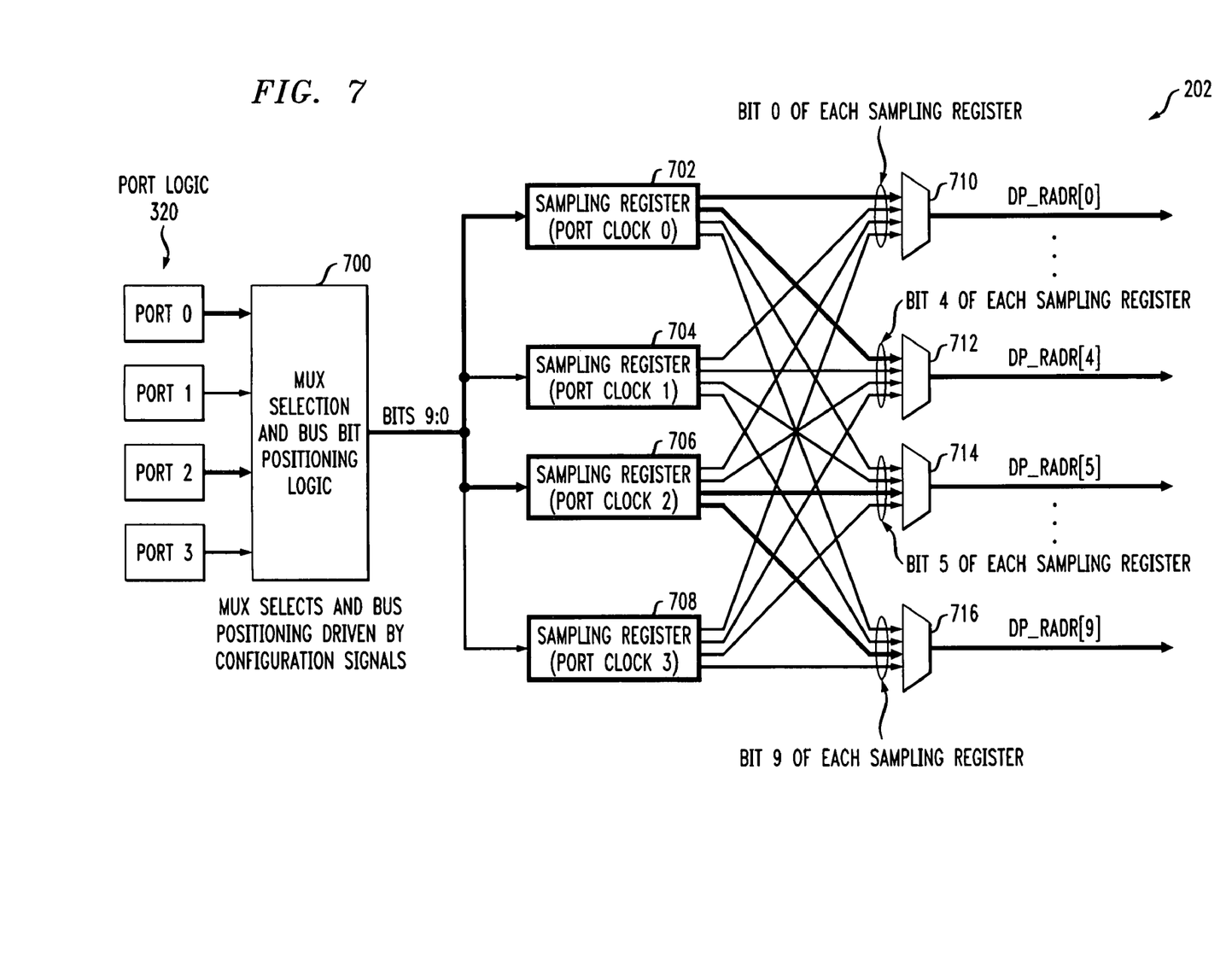
FIGS. 7 and 8 show examples of interface circuitry configured to provide controllable association between port logic clock domains and particular output signal lines of an interface.

Referring now to FIG. 7, an interface circuitry arrangement is shown in which polling addresses are driven from the network processor 102 to the external interface 105. In this example, there are five polling addresses from Port 0 and five polling addresses from Port 2. This illustrates output signals that can belong to any one of four clock domains. The interface circuitry includes multiplexer selection and bus bit positioning logic 700, sampling registers 702, 704, 706 and 708 associated with respective port clocks for Port 0, Port 1, Port 2 and Port 3, and multiplexers 710, 712, 714 and 716. The multiplexer selection and bus bit positioning logic 700 select is driven by configuration signals to select polling address bits 9:0 for delivery to selected ones of a receive polling address bus DP_RADR[9:0]. The multiplexers 710, 712, 714 and 716, also driven by configuration signals, operate to associate particular bits of the group of polling address bits with particular signal lines of the interface as shown.

Figure 8:
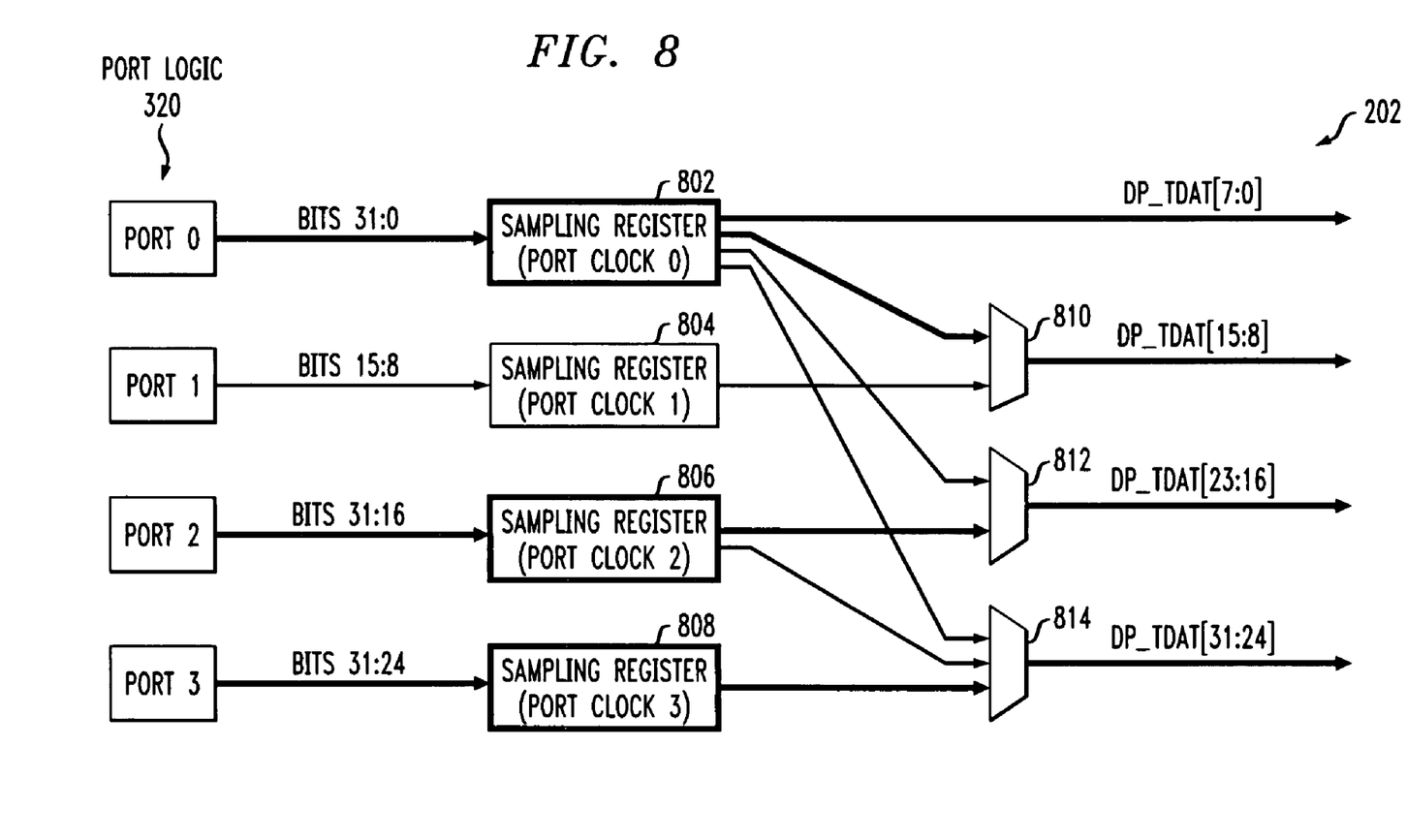

Another example, shown in FIG. 8, illustrates the association of particular output signals from the port logic 320 with particular signal lines of a transmit datapath bus DP_TDAT [31:0]. In this example, the interface circuitry comprises sampling registers 802, 804, 806 and 808 associated with respective port clocks for Port 0, Port 1, Port 2 and Port 3. Multiplexers 810, 812 and 814 are driven by configuration signals to provide the desired association between the output signals from the port logic 320 and the signals lines of the interface bus. This example illustrates a transmit bus assignment that corresponds to the receive bus assignment of FIG. 6B.

Numerous alternative interface circuitry arrangements may be used to provide other types of controllable association between output signal lines of the interface and clock domains of the network processor 102.

Advantageously, the arrangements described in the context of the illustrative embodiments above allow a given signal pin or other signal line of an interface between a network processor and a physical layer device to belong to one of many interface clock domains on a configurable basis that may be controlled by software. The problems associated with conventional usage of a common port clock or multiplexing of sample clocks are avoided. A high degree of configuration flexibility is provided, such that the same network processor can accommodate a wide variety of different applications and their associated interface clocking arrangements.

The network processor 102 having interface circuitry 202 and multiple interface clock domains 212 as described previously may be utilized in a wide variety of processing applications. For example, one such application may involve controlling the flow of packets between a physical transmission medium, such as a physical layer portion of, e.g., an asynchronous transfer mode (ATM) network or synchronous optical network (SONET), and a switch fabric in a router or other type of packet switch. Such routers and switches generally include multiple network processors, e.g., arranged in the form of an array of line or port cards with one or more of the processors associated with each of the cards. In an exemplary packet processing application such as that described above, an integrated circuit installed on a line card of a router or switch may comprise network processor 102.

It is apparent from the foregoing that a given embodiment of the present invention may comprise one or more integrated circuits. In such an arrangement, a plurality of identical die is typically formed in a repeated pattern on a surface of a semiconductor wafer. Each die may include a variety of structures or circuits. The individual die are cut or diced from the wafer, then packaged as an integrated circuit. One skilled in the art would know how to dice wafers and package die to produce integrated circuits. Integrated circuits so manufactured are considered part of this invention.

The above-described embodiments of the invention are intended to be illustrative only. For example, although the illustrative embodiments utilize particular numbers, types and arrangements of sampling registers, multiplexers and port logic, the invention may be implemented using a wide variety of other arrangements of these or alternative elements. For example, the particular manner in which an input bus, output bus or other set of interface signal lines is separated into portions, and the portions associated with different clock domains of a processor, can vary in other embodiments. Also, different types and arrangements of sampling registers and port logic elements can be used in other embodiments. These and numerous other alternative embodiments within the scope of the following claims will be apparent to those skilled in the art.

What is claimed is:

1. A processor comprising:
   an interface comprising a plurality of signal lines; and
   interface circuitry coupled to the interface and operative to receive clock signals for respective interface clock domains of the processor;
   said interface circuitry comprising a plurality of sampling registers;
   said sampling registers being associated with respective ones of the interface clock domains of the processor and being clocked by respective ones of the clock signals;

said interface circuitry being configurable in a plurality of different configurations, each providing a different association between designated subsets of the signal lines and the clock domains of the processor;

wherein in a first configuration of the plurality of configurations a given one of the signal lines is sampled using a first one of the clock signals having a first clock rate associated with a first one of the interface clock domains;

wherein in a second configuration of the plurality of configurations the given one of the signal lines is sampled using a second one of the clock signals having a second clock rate associated with a second one of the interface clock domains, the second clock rate being different than the first clock rate; and wherein the signal lines in a first one of the subsets are each coupled to inputs of multiple ones of the sampling registers in a corresponding first group of the sampling registers.

2. The processor of claim 1 wherein said interface circuitry further comprises a plurality of port logic elements.

3. The processor of claim 2
wherein in said first configuration a given one of the signal lines is sampled in a first one of the sampling registers using the first one of the clock signals associated with the first one of the interface clock domains, and an output of the first sampling register is supplied to a first one of the port logic elements also associated with said first one of the interface clock domains; and wherein in said second configuration the given one of the signal lines is sampled in a second one of the sampling registers using the second one of the clock signals associated with the second one of the interface clock domains, and an output of the second sampling register is supplied to a second one of the port logic elements also associated with said second one of the interface clock domains.

4. The processor of claim 1 wherein the interface comprises an interface between the processor and a physical layer device external to the processor.

5. The processor of claim 4 wherein the interface comprises multiple interfaces with respective physical layer devices external to the processor.

6. The processor of claim 4 wherein said physical layer device comprises at least one of a packet framer and a cell framer.

7. The processor of claim 1 wherein the signal lines of the interface correspond to respective signal pins of the interface.

8. The processor of claim 1 wherein the clock domains comprise respective port clock domains of the processor.

9. The processor of claim 1 wherein the interface comprises at least one of an input bus and an output bus of the processor.

10. The processor of claim 1 wherein the sampling registers in the first group of sampling registers operate using respective ones of the clock signals for the respective interface clock domains.

11. The processor of claim 2 wherein an output of a particular one of the sampling registers in the first group of sampling registers is selectable for application to a corresponding one of the port logic elements via a multiplexer.

12. The processor of claim 11 wherein outputs of the sampling registers in the first group of sampling registers are applied to respective inputs of the multiplexer and an output of the multiplexer is applied to an input of one of the port logic elements.

13. The processor of claim 11 wherein one or more configuration signals are applied to one or more selection inputs of the multiplexer so as to control selection of a particular one of the inputs for application to an input of one of the port logic elements.

14. The processor of claim 13 wherein said interface circuitry further comprises at least one configuration register for storing information utilized to generate the one or more configuration signals.

15. The processor of claim 1 wherein said processor is implemented in the form of an integrated circuit.

16. An integrated circuit comprising an interface having a plurality of signal lines, and interface circuitry operative to controllably assign different ones of the signal lines to different interface clock domains of the integrated circuit;

said interface clock domains having respective clock signals associated therewith, said interface circuitry being operative to receive clock signals for respective interface clock domains of the processor;

said interface circuitry comprising a plurality of sampling registers;

said sampling registers being associated with respective ones of the interface clock domains of the processor and being clocked by respective ones of the clock signals;

said interface circuitry being configurable in a plurality of different configurations, each providing a different association between designated subsets of the signal lines and the clock domains of the processor;

wherein in a first configuration of the plurality of configurations a given one of the signal lines is sampled using a first one of the clock signals having a first clock rate associated with a first one of the interface clock domains;

wherein in a second configuration of the plurality of configurations the given one of the signal lines is sampled using a second one of the clock signals having a second clock rate associated with a second one of the interface clock domains, the second clock rate being different than the first clock rate; and wherein the signal lines in a first one of the subsets are each coupled to inputs of multiple ones of the sampling registers in a corresponding first group of the sampling registers.

17. The integrated circuit of claim 16 wherein said integrated circuit comprises a network processor and said signal lines correspond to respective interface pins of the integrated circuit.

18. A method for use in a processor, said processor comprising an interface having a plurality of signal lines, said processor further comprising interface circuitry operative to receive clock signals for respective interface clock domains of the processor, said interface circuitry comprising a plurality of sampling registers clocked with respective ones of the clock signals, said method comprising the step of:

configuring the interface circuitry in one of a plurality of different configurations supported by said interface circuitry, each of said configurations providing a different association between designated subsets of the signal lines and the clock domains of the processor;

wherein in a first configuration of the plurality of configurations a given one of the signal lines is sampled using a first one of the clock signals having a first clock rate associated with a first one of the interface clock domains;

wherein in a second configuration of the plurality of configurations the given one of the signal lines is sampled using a second one of the clock signals having a second clock rate associated with a second one of the interface clock domains, the second clock rate being different than the first clock rate; and wherein the signal lines in a first one of the subsets are each coupled to inputs of multiple ones of the sampling registers in a corresponding first group of the sampling registers.

19. The method of claim 18 further including the step of separating the signal lines into at least first and second non-overlapping subsets of signal lines, wherein the signal lines in a first one of the subsets are each coupled to inputs of multiple ones of the sampling registers in a corresponding first group of the sampling registers.

* * * * *